United States Patent [19]
Takada et al.

[11] Patent Number: 5,631,312
[45] Date of Patent: May 20, 1997

[54] FLOOR PAINT COMPOSITION

[75] Inventors: Izumi Takada, Kakamigahara; Noriyuki Niwa; Ikuo Imaizumi, both of Tokyo-to, all of Japan

[73] Assignees: Kikusui Chemical Industries Co., Ltd., Nagoya; Hoechst Industry Limited, Tokyo, both of Japan

[21] Appl. No.: 652,638

[22] Filed: May 21, 1996

[30] Foreign Application Priority Data

May 22, 1995 [JP] Japan ..................... 7-122530

[51] Int. Cl.$^6$ ..................... C08L 13/02; C08L 63/00
[52] U.S. Cl. ..................... 524/5; 524/3; 524/4; 524/8; 524/261; 524/268; 524/436; 523/403; 523/443
[58] Field of Search ..................... 524/5, 4, 8, 261, 524/268, 436, 3; 523/403, 443

[56] References Cited

U.S. PATENT DOCUMENTS 4,710,540  12/1987  McAlpin et al. ..................... 524/3

FOREIGN PATENT DOCUMENTS

| | | |
|---|---|---|
| 48-43416 | 6/1973 | Japan . |
| 49-52823 | 5/1974 | Japan . |
| 53-144934 | 12/1978 | Japan . |
| 58-30257 | 6/1983 | Japan . |
| 6128009 | 5/1994 | Japan . |

*Primary Examiner*—Paul R. Michl
*Assistant Examiner*—Olga Asinovsky
*Attorney, Agent, or Firm*—Davis and Bujold

[57] ABSTRACT

A floor paint composition superior in resistance to oil and solvents, and in early strength. The composition is mainly composed of a synthetic resin emulsion based on an from anion copolymer obtained from the copolymerization of α-type hemihydrate gypsum, cement and ethylene unsaturated monomer. The ratio of weight of α-type hemihydrate gypsum to cement is between 80:20 and 95:5. The ratio of the solid content of the synthetic resin relative to 100 parts by weight of the mixture of α-type hemihydrate gypsum and cement is between 15 and 35 parts by weight. The anion copolymer contains at least one unit of a monomer selected from the group consisting of ethylene unsaturated carboxylic acid, ethylene unsaturated sulfonic acid and ethylene unsaturated phosphonic acid. The copolymer can include an ethylene unsaturated monomer having at least one organic silicon radical. The synthetic resin emulsion can include epoxy silane.

20 Claims, 1 Drawing Sheet

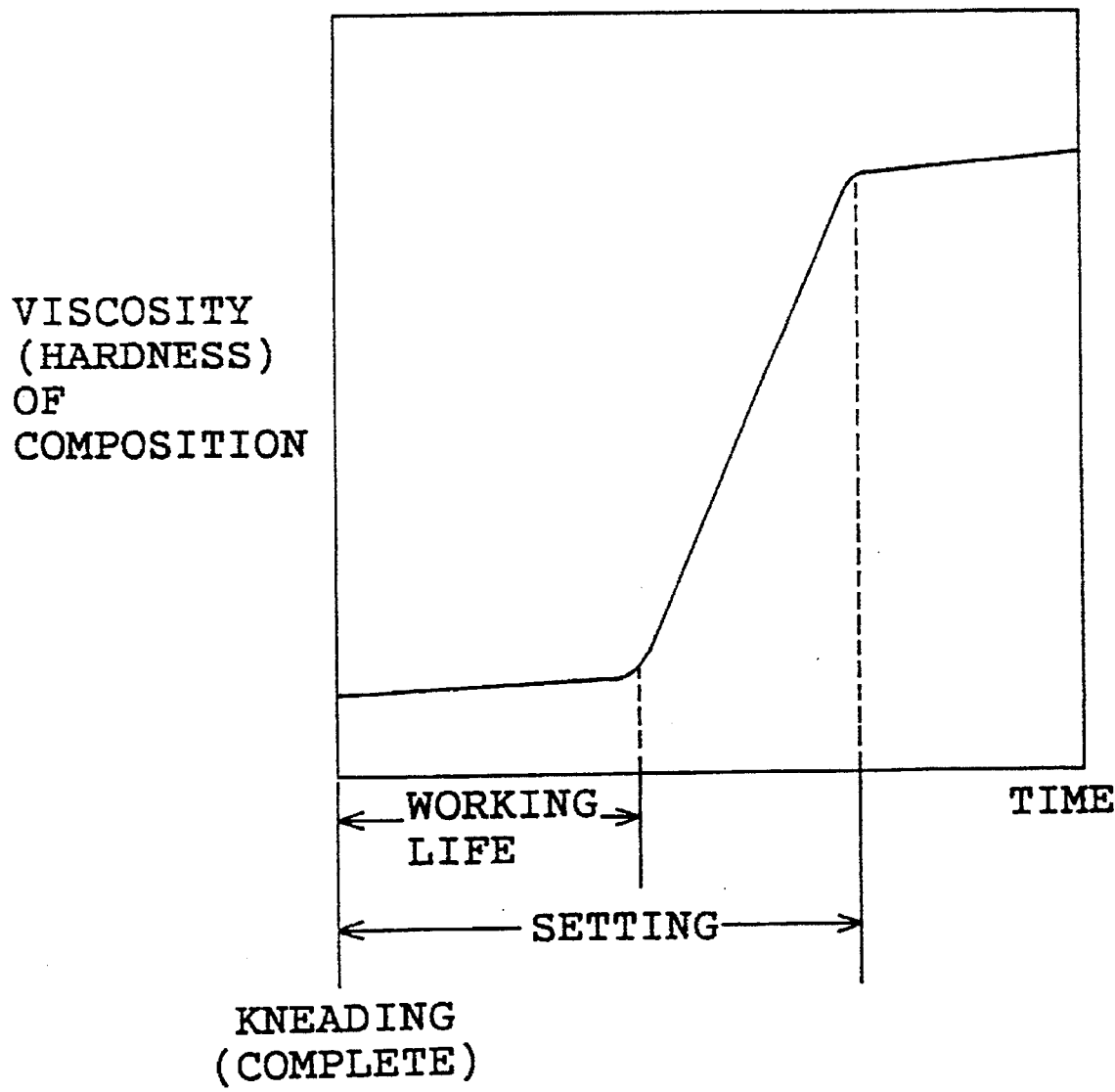

FLOOR PAINT COMPOSITION

FIELD OF THE INVENTION

This invention relates to a paint composition for use on the floor of a fuel or gas station or of a place for storing or applying the fuel, for example, on the floor of a building room, a staircase, a corridor, a veranda, a rooftop, a vehicle or a boat, especially on the floor exposed to the outside air, mainly in the field of architecture.

BACKGROUND OF THE INVENTION

In the relevant art, a gypsum-cement, gypsum-resin, or gypsum-cement-resin compositions are taught in which the water resistance of gypsum is improved. Such compositions are disclosed in Japanese laid-open Patent Application Nos. 49-52823 and 53-144934. In particular, the gypsum-cement-resin composition disclosed in Japanese examined and published Patent Application No.58-30257 provides sufficient water resistance for a short time, around one day. However, when the water resistance test is performed over a longer period of time, one week or longer, a problem arises, namely the composition swells.

In the gypsum-cement-resin composition described in Japanese laid-open Patent Application No. 48-43416, the content of the cement is of a larger ratio than that of the gypsum. Such a composition provides fluidity, water resistance and strength over a long period of time, but not without shortcomings. Primarily, the composition is susceptible to cracking over time.

To solve the aforementioned problems, Japanese laid-open Patent Application No. 6-128009 discloses a floor finish composition which can be applied in a short time and provides water resistance and crack prevention. The composition is mainly composed of 85 parts by weight of α-type hemihydrate gypsum, 15 parts by weight of white cement, 10 parts by weight of white pigment and 40 parts by weight of acrylic emulsion containing 57% of solid content. The composition provides a compression strength of about 80 kg/cm² two hours after the composition is applied. Several hours after the composition is applied to the floor, it can provide strength such that people can walk on the floor without any problem. The composition reduces the time for application, is superior in water resistance and fluidity, and is suitable as a self-leveling material and foundation preparing and finishing material.

The floor finish composition disclosed in Japanese laid-open Patent Application No. 6-128009 has superior fluidity, water resistance and early strength for its use on the floor. However, when the composition is exposed to solvents, oil, or the like, it tends to bulge. The strength of the composition is thus deteriorated such that the composition fails to bear use over a long period of time.

For example, in a gas station, a floor finish composition requires a resistance against solvents, oil, and the like, and a strength to bear a vehicle's weight. Especially in the winter season, a strength of at least about 150 kg/cm² is required so that the floor is not damaged by vehicles with tire chains. The aforementioned composition disclosed in 6-128009 indicates a relatively high compression strength of about 80 kg/cm² two hours after the composition is applied to the floor. However, on the next day the composition provides a compression strength of only about 90 kg/cm². The ratio of increase or rise in strength relative to time is insufficient. In general, when a floor composition is applied, it should set and have the requisite strength so that the floor can be used no later than the next day. Therefore, this conventional floor finish composition is not suited for the floor or the gas station floor.

SUMMARY OF THE INVENTION

Wherefore, an object of the present invention is to provide a floor paint composition superior in oil resistance, solvent resistance and early strength.

To attain this and other objects, the present invention provides a floor paint composition mainly composed of an α-type hemihydrate gypsum, a cement and a synthetic resin emulsion based on an anion copolymer obtained from the copolymerization of an ethylene unsaturated monomer. The ratio by weight of α-type hemihydrate gypsum and cement is between 80:20 and 95:5. The ratio of the solid content of the synthetic resin emulsion relative to 100 parts by weight of the mixture of α-type hemihydrate gypsum and cement is between 15 and 35 parts by weight. In the floor paint composition:

(1) the anion copolymer contains: at least one unit of a monomer selected from the group consisting of ethylene unsaturated carboxylic acid, ethylene unsaturated sulfonic acid, and ethylene unsaturated phosphonic acid; and an ethylene unsaturated monomer having at least an organosilicic radical;

(2) the anion copolymer contains: at least one unit of a monomer selected from the group consisting of ethylene unsaturated carboxylic acid, ethylene unsaturated sulfonic acid, and ethylene unsaturated phosphonic acid; and the synthetic resin emulsion contains epoxy silane; or (3) the anion copolymer contains: at least one unit of a monomer selected from the group consisting of ethylene unsaturated carboxylic acid, ethylene unsaturated sulfonic acid, and ethylene unsaturated phosphonic acid; and an ethylene unsaturated monomer having at least an organosilicic radical; and the synthetic resin emulsion contains epoxy silane.

The floor paint composition can contain 0.1 to 10 parts by weight of pigment relative to 100 parts by weight of the mixture of α-type hemihydrate gypsum and cement.

In detail, α-type hemihydrate gypsum for use in the present invention is 0.5 hydrate of calcined gypsum or calcium sulfate, preferably containing low moisture and having high solid strength. The cement for use is, for example, portland cement, pozzolan cement, portland blast-furnace slag cement, moderate heat portland cement, sulfate resisting portland cement, white portland cement or other.

In the floor paint composition according to the present invention the ratio of α-type hemihydrate gypsum to cement is in the range between 80:20 and 95:5, thereby providing high early strength. The composition provides a compression strength of at least 200 kgf/cm² two or three hours after the composition is kneaded. If the ratio of α-type hemihydrate gypsum to cement deviates from the aforementioned range, the composition provides insufficient early strength and water resistance. If β-type hemihydrate gypsum or another replaces the α-type hemihydrate gypsum, the composition has its early strength, water resistance, oil resistance or other properties remarkably deteriorated and fails to bear its practical use.

The synthetic resin emulsion for use in the present invention is based on anion copolymer obtained from the copolymerization of an ethylene unsaturated monomer. The minimum filming temperature (referred to as MFT below) of the emulsion is preferably higher than the curing temperature of plastic viscous mortar mixture, for example, between 23° C. and 100° C., especially between 30° C. and 50° C. The glass transition temperature in the unit of Tg is preferably higher than 23° C., especially higher than 30° C. The synthetic resin emulsion is for example, (meta-)acrylic acid/styrene copolymer and/or (meta-)acrylate copolymer.

In the synthetic resin emulsion based on the anion copolymer obtained from copolymerization of ethylene unsaturated monomer:

(1) the anion copolymer contains: (i) at least one unit of monomer selected from the group consisting of ethylene unsaturated carboxylic acid, ethylene unsaturated sulfonic acid, and ethylene unsaturated phosphonic acid; and (ii) an ethylene unsaturated monomer having at least one organosilicic radical;

(2) the anion copolymer contains (i) at least one unit of monomer selected from the group consisting of ethylene unsaturated carboxylic acid, ethylene unsaturated sulfonic acid and ethylene unsaturated phosphonic acid, and (iii) the synthetic resin emulsion contains epoxy silane; or (3) the anion copolymer contains (i) at least one unit of monomer selected from the group consisting of ethylene unsaturated carboxylic acid, ethylene unsaturated sulfonic acid and ethylene unsaturated phosphonic acid, and (ii) an ethylene unsaturated monomer having at least one organosilicic radical, and (iii) the synthetic resin emulsion contains epoxy silane.

The percentage by weight of the aforementioned composition elements (i)–(iii) relative to the solid content of the synthetic resin emulsion is not especially restricted. Preferably, the percentage of element (i) is between 0.025 and 2.5% by weight, that of element (ii) is 1% by weight or less, and that of element (iii) is 1% by weight or less. In the aforementioned feature (3), the percentage of elements (ii) and (iii) in total is preferably 1% by weight or less. As element (ii), for example, vinyl silane, vinyl siloxane or other can be used. The synthetic resin emulsion can contain, in addition to water, an anionic or nonionic surface active agent as an emulsifier.

The floor paint composition according to the present invention includes a solid content of the synthetic resin emulsion of 15 to 35 parts by weight relative to 100 parts by weight of the mixture of α-type hemihydrate gypsum and cement. Conventionally, by adding resin content to the composition including a large amount of gypsum, water resistance and wear resistance are enhanced. In this solution, however, when the amount of synthetic resin emulsion is increased, the working life during which the composition can be applied without any problem is disadvantageously extended. Furthermore, the setting time during which the strength or hardness of the composition reaches a predetermined level is increased. To solve this problem, in the present invention, the content of the synthetic resin emulsion is restricted such that the duration of the working life, the duration of the setting time and the value of the early strength are well balanced. As shown in the graph of FIG. 1, the working life indicates the time from when kneading is completed till an inflection point at which the rate of rise in viscosity of the composition relative to time is rapidly increased, and the setting time indicates the time from when kneading is completed till an inflection point at which the rate of rise in viscosity of the composition relative to time is rapidly decreased. Preferably, the working life is about 20 minutes and the setting time is within two hours. If the solid content of the synthetic resin emulsion is less than 15 parts by weight, water resistance and oil resistance are worsened over a long time, the setting time is excessively shortened, or wear resistance is deteriorated. To the contrary, if the content exceeds 35 parts by weight, early strength is remarkably impaired and the setting time is excessively lengthened.

When the compression strength of the composition obtained by kneading the synthetic resin emulsion together with the particles of α-type hemihydrate gypsum and cement is at least 70 kgf/cm$^2$ two hours after they are kneaded, the composition provides no cracks or indentations during the actual walk test. At a compression strength of at least 150 kgf/cm$^2$, the composition can also bear against the force of a vehicle with tire chains attached thereto, producing no flaws or recesses on its surface during the run test.

The floor paint composition according to the present invention can contain 0.1 to 10 parts by weight of pigment relative to 100 parts by weight of the mixture of α-type hemihydrate gypsum and cement. Various inorganic pigments, having resistance to wear and weather, are preferably used in white and other various colors. The composition can be colored with various known pigments. For example, titanic oxide, zinc flower, lithopone, zirconia, calcium carbonate as white extender pigment, silicate pigment, or clay is white inorganic pigment. Red pigment is synthetic iron oxide or loess. Green pigment is chromium oxide. Blue pigment is cobalt blue, or ultramarine blue pigment. Typical black pigment is synthetic iron oxide, or carbon black. For organic pigments, red pigment is brilliant carmine 6B, watching red, lake red 4R, chromophthal red, thioindigo, or quinacridone red. Yellow organic pigment is hanza yellow G, disazo-yellow G, chromophthal yellow 3G, anthra-pyrimidine, or isoindoline yellow. Blue pigment is copper phthalocyanine, or indanthrone. Green pigment is chlorinated copper phthalocyanine, or other.

In addition to the aforementioned four components: α-type hemihydrate gypsum; cement; synthetic resin emulsion; and pigment, an appropriate quantity of the following agents can be added. The particles composed of α-type hemihydrate gypsum and cement, including pigment, can additionally contain the following agents: lignosulfonate, oxyorganic salt, alkyl aryl sulfonate or other water reducing agent; Na salt of the high condensate of melamine sulfonic acid and formalin or other high performance water reducing agent; fluidization agent; sodium aluminate, sodium carbonate or other set accelerating agent; calcium chloride, potassium sulfate, calcium nitrate or other hardening accelerator agent; lignosulfonate, lactic acid, tartaric acid, citric acid or other retardant; dispersant; rust preventives; waterproofing agent; expanding agent; abrasion proofing agent; or other. Furthermore, an appropriate quantity of dispersant, wetting agent, thickening agent, antifoam agent, antiseptic agent, mildewproofing agent or other can be added to the aforementioned liquid component composed of the aforementioned synthetic resin emulsion. These additives can be added by an appropriate quantity within the range of the present invention. The viscosity of the composition of the present invention can be adjusted by adding water to the composition as required.

BRIEF DESCRIPTION OF THE DRAWINGS

The invention will now be described, by way of example, with reference to the drawings, in which:

FIG. 1 is a graph showing the change in viscosity of the composition over time.

DETAILED DESCRIPTION OF THE PREFERRED EMBODIMENTS

In Embodiment 1, particles were prepared by blending 85 parts by weight of α-type hemihydrate gypsum, 15 parts by weight of white cement, 10 parts by weight of white pigment consisting of 3 parts by weight of titanium oxide and 7 parts by weight of calcium carbonate, 0.1 parts by weight of retardant or citric acid, and 7 parts by weight of reaction accelerator or calcium nitrate. The liquid component was prepared by blending 40 parts by weight of artion synthetic resin emulsion including 50% of solid content, 15 parts by weight of water, 0.4 parts by weight of dispersant having the tradename of Disconate N-14 manufactured by Daiichi Kogyo Seiyaku Kabushiki Kaisha, 0.7 parts by weight of thickening agent having the tradename of Thilose MH2000 manufactured by Hoechst Industry Co., Ltd., 0.2 parts by weight of antifoam agent having the tradename Adecanate B940 manufactured by Asahi Denka Kogyo Kabushiki Kaisha, and 0.2 parts by weight of antiseptic and mildew-proofing agent having the tradename Melgirl AF manufactured by Hoechst Industry Co., Ltd.

As anion synthetic resin emulsion, the synthetic resin emulsion was based on anion copolymer composed of 53 parts by weight of styrene, 42.7 parts by weight of n-butyl acrylate, 2 parts by weight of acrylic acid, 1.5 parts by weight of ethylene unsaturated monomer including sulfonic acid, and 0.8 parts by weight of vinyl silane. Furthermore, the emulsion was additionally blended with 0.7 parts by weight of epoxy silane. The emulsion also included the emulsifying agent composed of 0.6% by weight of alkaline metal salt of hemlester of sulfuric acid and oxyethyl tributyl phenol, and 2% by weight of tributyl phenol polyglycol ether having an ethylene oxide unit of about 30, relative to the anion copolymer. By adding water, the solid content in the anion synthetic resin emulsion was adjusted to 50%.

In Embodiment 1, the composition of the present invention was prepared by kneading 10 kg of the particles and 4 kg of the liquid component in a kneading container. By adding water to the composition, the fluidity was adjusted and the viscosity was adjusted to a workable level or 2000 cps. Various tests were conducted on the kneaded slurry.

For the measurement of compression strength, the kneaded slurry was first east in an iron frame having inner dimensions of 4 cm×4 cm×16 cm, and cured in a room at a temperature of 20° C. and a relative humidity of 60%. The compression strength was measured two hours and 24 hours after a mold was finished. Results were 80.5 kgf/cm$^2$ two hours after, and 162 kgf/cm$^2$ 24 hours after.

For the water resistance test, a test piece, molded from the same iron frame as aforementioned, was half immersed in water at 20° C. The water was changed and the test piece was visually observed every day. As a result, the test piece showed no abnormal appearance three days later and one week later.

For the test of resistance to oil and solvents, a method of testing the resistance of plastic to chemicals, K7115 according to Japanese Industrial Standards, was used. A test piece having a diameter of 50 mm and a thickness of 3 mm was prepared and cured in a room at 20° C. with a relative humidity of 60% for seven days. Subsequently, the test pieces were immersed in the following respective chemicals: gasoline; kerosene; toluene; and gas oil, and left at rest in a constant temperature unit at a temperature of 23°±2° C. for seven days. The surface of the test pieces was wiped off and the mass change rate of the test pieces was measured. As a result, the test piece, immersed in gasoline, had a gain of 2.11% in mass: kerosene 1.03%; toluene 2.97%; and gas oil 0.92%, respectively. There was no craze, swelling, warpage or bite on the surface of the test pieces.

The abrasion resistance test was conducted using a Taber abrader at a load of 1 kg and a revolution number of 1000 rpm. To prepare test pieces, a slurry having its viscosity adjusted to 2000 cps was cast in a disc iron frame having a diameter of 10 cm and a height of 2 mm and cured at 20° C. and 60% relative humidity for seven days. As a result, wear weight was 0.7 g.

The setting time was measured using a four-barrel automatic setting test machine. The time until a needle having a predetermined load failed to be inserted into the slurry was measured at 45 minutes, as a result.

The compositions according to Embodiments 2–5 and References 1–6 were classified into the particles and the liquid component, as shown in Table 1. In Table 1, each component is shown in a unit of parts by weight. For these embodiments and references, the same synthetic resin emulsion as in Embodiment 1 was used.

The compositions of the present invention shown in Table 1 were prepared. By adding water to the compositions, the viscosity of the kneaded slurry was adjusted to between 1500 and 2000 cps. In the same manner as in Embodiment 1, the compression strength test, the water resistance test, the chemicals resistance test, the measurement of setting time, and the abrasion resistance test were conducted on the kneaded slurry having its viscosity adjusted. Results are shown in Table 2.

TABLE 1

|  | EMBODIMENT | | | | | REFERENCE | | | | | |
|---|---|---|---|---|---|---|---|---|---|---|---|
|  | 1 | 2 | 3 | 4 | 5 | 1 | 2 | 3 | 4 | 5 | 6 |
| PARTICLE | | | | | | | | | | | |
| α-TYPE HEMIHYDRATE GYPSUM | 85 | 95 | 80 | 85 | 85 |  | 100 | 70 | 50 | 85 | 85 |
| β-TYPE HEMIHYDRATE |  |  |  |  |  | 85 |  |  |  |  |  |
| WHITE CEMENT | 15 | 5 | 20 | 15 | 15 | 15 | 0 | 30 | 50 | 15 | 15 |
| TITANIUM OXIDE | 3 | 3 | 3 | 0 | 0 | 3 | 3 | 3 | 3 | 3 | 3 |
| CALCIUM CARBONATE | 7 | 7 | 7 | 0 | 0 | 7 | 7 | 7 | 7 | 7 | 7 |
| RETARDANT | 0.1 | 0.1 | 0.1 | 0.1 | 0.1 | 0.1 | 0.1 | 0.1 | 0.1 | 0.1 | 0.1 |
| REACTION ACCELERATOR | 7 | 7 | 7 | 7 | 7 | 7 | 7 | 7 | 7 | 7 | 7 |
| LIQUID | | | | | | | | | | | |
| SYNTHETIC RESIN EMULSION (N.V = 50%) | 40 | 45 | 45 | 35 | 65 | 45 | 45 | 45 | 45 | 20 | 90 |
| WATER | 15 | 10 | 10 | 16 | 0 | 10 | 10 | 10 | 10 | 20 | 0 |

TABLE 1-continued

|  | EMBODIMENT | | | | | REFERENCE | | | | | |
| --- | --- | --- | --- | --- | --- | --- | --- | --- | --- | --- | --- |
|  | 1 | 2 | 3 | 4 | 5 | 1 | 2 | 3 | 4 | 5 | 6 |
| DISPERSANT | 0.4 | 0.4 | 0.4 | 0.4 | 0.4 | 0.4 | 0.4 | 0.4 | 0.4 | 0.4 | 0.4 |
| THICKENING AGENT | 0.7 | 0.7 | 0.7 | 1 | 0.5 | 0.7 | 0.7 | 0.7 | 0.7 | 1 | 0.5 |
| ANTIFOAM AGENT | 0.2 | 0.2 | 0.2 | 0.2 | 0.2 | 0.2 | 0.2 | 0.2 | 0.2 | 0.2 | 0.2 |
| ANTISEPTIC · MILDEW-PROOFING AGENT | 0.2 | 0.2 | 0.2 | 0.2 | 0.2 | 0.2 | 0.2 | 0.2 | 0.2 | 0.2 | 0.2 |

TABLE 2

| | COMPRESSION STRENGTH ($kgf/cm^2$) | | WATER RESISTANCE | | RESISTANCE TO OIL · SOLVENTS (MASS CHANGE RATIO %) | | | | SETTING TIME | WEAR (g) |
| --- | --- | --- | --- | --- | --- | --- | --- | --- | --- | --- |
| | 2 HOURS | 24 LATER | 3 DAYS LATER | ONE WEEK LATER | GAS-OLINE | KER-OSENE | TOLUENE | GAS OIL | | |
| EMBODIMENT | | | | | | | | | | |
| 1 | 81 | 162 | NO PROBLEM | NO PROBLEM | 2.11 | 1.03 | 2.97 | 0.92 | 45 MINUTES | 0.70 |
| 2 | 87 | 168 | NO PROBLEM | NO PROBLEM | 2.25 | 1.12 | 2.82 | 0.82 | 50 MINUTES | 0.70 |
| 3 | 82 | 162 | NO PROBLEM | NO PROBLEM | 2.31 | 1.08 | 3.03 | 0.91 | 65 MINUTES | 0.62 |
| 4 | 103 | 175 | NO PROBLEM | NO PROBLEM | 2.88 | 1.63 | 2.77 | 0.99 | 35 MINUTES | 1.08 |
| 5 | 80 | 166 | NO PROBLEM | NO PROBLEM | 2.01 | 0.82 | 3.41 | 0.79 | 100 MINUTES | 0.51 |
| 6 | 88 | 173 | NO PROBLEM | NO PROBLEM | 2.39 | 1.02 | 3.86 | 1.10 | 45 MINUTES | 0.63 |
| 7 | 83 | 168 | NO PROBLEM | NO PROBLEM | 2.41 | 1.13 | 3.03 | 1.42 | 70 MINUTES | 0.91 |
| REFERENCE | | | | | | | | | | |
| 1 | 26 | 53 | COLLAPSED | | 11.35 | 10.22 | 28.51 | 6.31 | >8 HOURS | 4.96 |
| 2 | 62 | 141 | SLIGHTLY SWELL | SWELL | 2.76 | 1.27 | 3.45 | 1.35 | 40 MINUTES | 2.83 |
| 3 | 65 | 96 | NO PROBLEM | SLIGHTLY SWELL | 2.71 | 1.22 | 3.51 | 1.28 | 65 MINUTES | 3.17 |
| 4 | 38 | 87 | COLLAPSED | | 3.41 | 2.01 | 3.40 | 1.61 | >8 HOURS | 2.53 |
| 5 | 147 | 159 | SWELL | SWELL AND COLLAPSED | 16.37 | 6.92 | 21.59 | 3.42 | 20 MINUTES | 3.24 |
| 6 | 23 | 36 | COLLAPSED | | 1.02 | 0.87 | 4.11 | 0.62 | >8 HOURS | 0.91 |
| 7 | 78 | 136 | NO PROBLEM | NO PROBLEM | 15.29 | 10.36 | 29.15 | 9.27 | 6 HOURS | 1.44 |
| 8 | 61 | 121 | NO PROBLEM | SLIGHTLY SWELL | 17.32 | 11.51 | 31.91 | 9.36 | 2 HOURS | 1.96 |

Embodiments 6, 7 and References 7, 8 have the same composition of particles as in Embodiment 1, but a composition of liquid different from that in Embodiment 1. In the same manner as the other embodiments and references, the kneaded slurry was prepared, and the slurry or the cured composition was tested for compression strength, water resistance, resistance to chemicals, setting time and abrasion resistance. Results are shown in Table 2.

Regarding the synthetic resin emulsion, Embodiment 6 is the same as Embodiment 1, except in that the synthetic resin emulsion contains no epoxy silane. Embodiment 7 is the same as Embodiment 1, except in that no vinyl silane is contained as a component of the anion copolymer basing the synthetic resin emulsion. Reference 7 is the same as Embodiment 1, except that the synthetic resin emulsion contains no epoxy silane and the anion copolymer basing the emulsion contains no vinyl silane. Reference 8 is the same as Embodiment 1, except that cation styrene acryl emulsion is used as the synthetic resin emulsion.

As seen in Table 2, in Embodiments 1–7, the early strength, two hours later, is not less than 80 kg/cm² and the next day strength, 24 hours later, is not less than 160 kg/cm². The rising strength or increase rate of strength with time is high and the early strength is superior. Even after immersed in water, the compositions show no abnormal appearance. Even after immersed in gasoline, kerosene, toluene and gas oil, the compositions provide only small percentage changes in mass. The compositions are superior in resistance to water, oil and solvents, and are also superior in abrasion resistance. Therefore, even when the composition of the present invention is applied onto the floor of, for example, the gas station, it can be prevented from being expanded with oil or solvent, and can be prevented from being scratched or depressed by a tire chain attached to the vehicle wheels. Also as seen in Table 2, in Embodiments 1-7, the setting time is between 35 and 100 minutes, therefore within two hours, and the compression strength two hours after application is not less than 80 kgf/cm². The setting time is sufficiently long such that the floor paint composition can be applied or poured on a predetermined section of the floor. Additionally, the composition sets in a sufficiently short time such that people can walk on the floor with the composition applied thereon early, thereby providing superior workability. The floor paint composition according to these embodiments is clearly superior in workability.

Reference 1, in which β-type hemihydrate gypsum is used instead of α-type hemihydrate gypsum, has early strength, next day strength, water resistance, oil resistance, solvent resistance and abrasion resistance all inferior to those in Embodiments 1-7. The setting time is also remarkably extended. References 2-4, in which the ratio of α-type hemihydrate gypsum to white cement is deviated from that of the present invention, have early strength, next day strength, water resistance and abrasion resistance inferior to those in Embodiments 1-7. Reference 5, in which the rate of synthetic resin emulsion is less than that of the present invention, has resistance to water, oil, solvents and to abrasion inferior to those in Embodiments 1-7. Reference 6, in which the ratio of synthetic resin emulsion is larger than that of the present invention, has early strength, next day strength and water resistance remarkably inferior to those in Embodiments 1-7, and has a remarkably longer setting time. References 7, 8, in which the synthetic emulsion other than those for use in the present invention is used, have early strength, next day strength, oil resistance, solvent resistance and abrasion resistance all remarkably inferior to those in Embodiments 1-7, and have a remarkably longer setting time.

The floor paint composition according to the present invention gains a compression strength of not less than 80 kgf/cm² only several hours after the composition is kneaded and applied onto the floor, such that people can walk on the floor only several hours after application. The composition can gain a compression strength of not less than 150 kgf/cm² 24 hours after application. The composition is thus provided with superior early strength, and can sufficiently bear the load locally applied, for example, by tire chains. The composition is also superior in resistance to oil and solvents.

Since the floor paint composition according to the present invention is superior in early strength, oil resistance and solvent resistance, the construction term is shortened. The floor is prevented from being occupied for a long period of time due to repair work. The floor paint composition can also be used in various industrial fields for leveling or finishing the floor to be applied with oil, solvents or other materials. Furthermore, the composition can be effectively used, for example, on the floor of a gas station, which is subject to oil, solvents or other materials and requires high strength. By adding an adequate quantity of pigment to the composition, the floor surface can be aesthetically finished.

This invention has been described above with reference to the preferred embodiment as shown in the figures. Modifications and alterations may become apparent to one skilled in the art upon reading and understanding the specification. Despite the use of the embodiment for illustration purposes, the invention is intended to include all such modifications and alterations within the spirit and scope of the appended claims.

What is claimed is:

1. A floor paint composition comprising:
   an alpha-type hemihydrate gypsum and cement mixture having a ratio by weight of the alpha-type hemihydrate gypsum to the cement of between about 80:20 and about 95:5; and
   a synthetic resin emulsion based on an anion copolymer, the emulsion having a ratio of solid content relative to 100 parts by weight of the mixture of between about 15 parts and about 35 parts by weight;
   wherein the anion copolymer comprises
   a) at least one unit of a monomer selected from the group consisting of ethylene unsaturated carboxylic acid, ethylene unsaturated sulfonic acid, and ethylene unsaturated phosphonic acid, and
   b) an ethylene unsaturated monomer having at least one organic silicon radical.

2. A floor paint composition as claimed in claim 1, wherein the synthetic resin emulsion contains epoxy silane.

3. A floor paint composition as claimed in claim 1, comprising:
   a pigment, from about 0.1 to about 10 parts by weight of the pigment relative to about 100 parts by weight of the mixture.

4. A floor paint composition as claimed in claim 1, wherein the alpha-type hemihydrate gypsum is about 0.5 hydrate of at least one of calcined gypsum and calcium sulfate.

5. A floor paint composition as claimed in claim 1, wherein the emulsion has a minimum filming temperature that is higher than a curing temperature of a plastic viscous mortar mixture.

6. A floor paint composition as claimed in claim 5, wherein the minimum filming temperature is between about 23° C. and about 100° C.

7. A floor paint composition as claimed in claim 1, wherein the cement is selected from the group consisting of portland cement, pozzolan cement, portland blast furnace slag cement, moderate heat portland cement, sulfate resisting portland cement, and white portland cement.

8. A floor paint composition as claimed in claim 2, wherein the percentage by weight of the at least one unit of a monomer relative to the solid content of the synthetic resin emulsion is between about 0.025 percent and about 2.5 percent by weight, the percentage by weight of the ethylene unsaturated monomer relative to the solid content of the synthetic resin emulsion is between about 0.0 percent and about 1.0 percent by weight, and the percentage by weight of the epoxy silane relative to the solid content of the synthetic resin emulsion is between about 0.0 percent and about 1.0 percent by weight.

9. A floor paint composition as claimed in claim 2, wherein the percentage by weight combined of the ethylene unsaturated monomer and the epoxy silane is between about 0.0 and about 1.0 percent by weight.

10. A floor paint composition as claimed in claim 1, wherein the ethylene unsaturated monomer is vinyl silane.

11. A floor paint composition as claimed in claim 1, wherein the ethylene unsaturated monomer is vinyl siloxane.

12. A floor paint composition as claimed in claim 1, comprising at least one of
   a) a water reducing agent comprising at least one of lignosulfonate, oxyorganic salt, and alkyl aryl sulfonate;
   b) a fluidization agent;
   c) a set accelerating agent comprised of at least one of sodium aluminate and sodium carbonate;

d) a hardening accelerator agent comprised of at least one of calcium chloride, potassium sulfate, and calcium nitrate;

e) a retardant comprising at least one of lignosulfonate, lactic acid, tartaric acid, and citric acid;

f) a dispersant;

g) a rust preventative;

h) a waterproofing agent;

i) an expanding agent;

j) a high performance water reducing agent comprised of at least one of a Na salt of the high condensate of melamine sulfonic acid and formalin; and k) an abrasion proofing agent.

13. A floor paint composition as claimed in claim 1, wherein the synthetic resin emulsion comprises at least one of a dispersant, a wetting agent, a thickening agent, an antifoam agent, an antiseptic agent, and a mildewproofing agent.

14. A floor paint composition as claimed in claim 1, wherein the synthetic resin emulsion contains at least one of an anionic surface active agent and a nonionic surface active agent as an emulsifier.

15. A floor paint composition as claimed in claim 1, wherein the synthetic resin emulsion is at least one of a (meta-)acrylic acid copolymer, a (meta-)acrylic styrene copolymer, and a (meta-)acrylic copolymer.

16. A floor paint composition comprising:

an alpha-type hemihydrate gypsum and cement mixture having a ratio by weight of the alpha-type hemihydrate gypsum to the cement of between about 80:20 and about 95:5; and a synthetic resin emulsion based on an anion copolymer, the emulsion having a ratio of solid content relative to 100 parts by weight of the mixture of between about 15 parts and about 35 parts by weight;

wherein the anion copolymer comprises at least one unit of a monomer selected from the group consisting of ethylene unsaturated carboxylic acid, ethylene unsaturated sulfonic acid, and ethylene unsaturated phosphonic acid, and the synthetic resin emulsion contains epoxy silane.

17. A floor paint composition as claimed in claim 16, comprising:

a pigment, from about 0.1 to about 10 parts by weight of the pigment relative to about 100 parts by weight of the mixture.

18. A floor paint composition as claimed in claim 16, wherein the alpha-type hemihydrate gypsum is about 0.5 hydrate of at least one of calcined gypsum and calcium sulfate.

19. A floor paint composition as claimed in claim 16, wherein the emulsion has a minimum filming temperature that is higher than a curing temperature of a plastic viscous mortar mixture.

20. A floor paint composition as claimed in claim 16, wherein the cement is selected from the group consisting of portland cement, pozzolan cement, portland blast furnace slag cement, moderate heat portland cement, sulfate resisting portland cement, and white portland cement.

* * * * *